United States Patent
Karri et al.

(10) Patent No.: US 11,556,627 B2
(45) Date of Patent: Jan. 17, 2023

(54) INTELLIGENT SCREEN PROTECTOR

(71) Applicant: International Business Machines Corporation, Armonk, NY (US)

(72) Inventors: Venkata Vara Prasad Karri, Visakhapatnam (IN); Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 51 days.

(21) Appl. No.: 17/241,526

(22) Filed: Apr. 27, 2021

(65) Prior Publication Data

US 2022/0342974 A1 Oct. 27, 2022

(51) Int. Cl.
| | | |
|---|---|---|
| H04B 1/3888 | (2015.01) | |
| H04M 1/18 | (2006.01) | |
| G06F 21/34 | (2013.01) | |
| H04L 9/40 | (2022.01) | |

(52) U.S. Cl.
CPC .......... *G06F 21/34* (2013.01); *H04B 1/3888* (2013.01); *H04L 63/0853* (2013.01); *H04M 1/185* (2013.01)

(58) Field of Classification Search
CPC ....... H04M 1/185; H04B 1/3888; H04B 1/03; H04L 63/0853; G06F 21/34
See application file for complete search history.

(56) References Cited

U.S. PATENT DOCUMENTS

| | | | |
|---|---|---|---|
| 8,548,540 B2 | 10/2013 | Jain et al. | |
| 2006/0144934 A1* | 7/2006 | Fletcher | G06F 1/1609 |
| | | | 235/383 |
| 2012/0138675 A1 | 6/2012 | Narendra et al. | |
| 2014/0024226 A1 | 1/2014 | Augustinowicz | |

(Continued)

FOREIGN PATENT DOCUMENTS

CN WO2021051800 A1 * 3/2021 ............. H04M 1/18

OTHER PUBLICATIONS

"Transparent OLED Screen", https://prodisplay.com/products/transparent-oled-screen/, downloaded from internet on Mar. 2, 2021, 8 pages.

(Continued)

*Primary Examiner* — Andrew Wendell
(74) *Attorney, Agent, or Firm* — Stephen J. Walder, Jr.; Randy E. Tejeda

(57) ABSTRACT

An intelligent screen protector is provided. Responsive to the intelligent screen protector being detached from a paired portable computing device, the intelligent screen protector identifies a set of instructions received from the paired portable computing device associated with visually generating an image of a selected smartcard. In accordance with the set of instructions, the intelligent screen protector visually generates the image of the selected smartcard in a transparent display area of the intelligent screen protector. The intelligent screen protector determines whether a transaction associated with the selected smartcard has been initiated. Responsive to the transaction associated with the (Continued)

selected smartcard being initiated, the intelligent screen protector discontinues the visual generation of the image of the selected smartcard in the transparent display area of the intelligent screen protector.

21 Claims, 4 Drawing Sheets

(56) References Cited

U.S. PATENT DOCUMENTS

| | | | | |
|---|---|---|---|---|
| 2014/0233180 A1* | 8/2014 | Vargas | ............... | G06F 1/1613 |
| | | | | 361/679.55 |
| 2016/0179294 A1* | 6/2016 | Song | ............... | H04M 1/185 |
| | | | | 715/808 |
| 2016/0247138 A1 | 8/2016 | Wallner | | |
| 2016/0277053 A1* | 9/2016 | Wong Chee | ............... | G06F 1/1669 |
| 2017/0344255 A1* | 11/2017 | Xie | ............... | G06F 3/0487 |
| 2018/0260554 A1* | 9/2018 | Singh | ............... | G06F 21/34 |

OTHER PUBLICATIONS

"Transparent OLEDs: introduction and market status", https://www.oled-info.com/transparent-oleds, Jul. 10, 2019, 9 pages.
"What is MST (Magnetic Secure Transmission)?", https://www.samsung.com/global/galaxy/what-is/magnetic-secure-transmission/, downloaded from the internet on Mar. 2, 2021, 1 page.
Freudenrich, Craig , "How OLEDs Work", https://electronics.howstuffworks.com/oled4.htm, downloaded from the internet on Mar. 2, 2021, 13 pages.

* cited by examiner

INTELLIGENT SCREEN PROTECTOR

BACKGROUND

The present application relates generally to an improved data processing apparatus and method and more specifically to mechanisms for an intelligent screen protector.

A screen protector is a relatively inexpensive sheet of clear plastic that adheres to a display of a computing device. The plastic is cut to fit the exact shape of the display of the computing device, and may include holes for buttons, a speaker, a camera, or the like. Screen protectors are made to safeguard the display of the computing device from scratches and cracks, but have no intelligence, processing capability, or display capability themselves. Again, they are simply a sheet of clear plastic overlaying the display of the computing device, through which the output of the display can be viewed by a human being due to the transparency of the sheet of clear plastic.

While many screen protectors are removable from the display that they protect, such as for replacement purposes, they are designed to not be frequently removed. That is, the intent of a screen protector is for it to be adhered to the display of the computing device and then left on the screen for an indefinite amount of time until it is to be replaced. Typically, when a screen protector is removed from the display to which it is adhered, it is no longer usable as its ability to adhere to other displays is compromised or it gets damaged in the removal process.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for an intelligent screen protector. The illustrative embodiment identifies a set of instructions received from a paired portable computing device associated with visually generating an image of a selected smartcard in response to the intelligent screen protector being detached from the paired portable computing device. The illustrative embodiment, in accordance with the set of instructions, visually generates the image of the selected smartcard in a transparent display area of the intelligent screen protector. The illustrative embodiment determines whether a transaction associated with the selected smartcard has been initiated. The illustrative embodiment discontinues the visual generation of the image of the selected smartcard in the transparent display area of the intelligent screen protector in response to the transaction associated with the selected smartcard being initiated.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
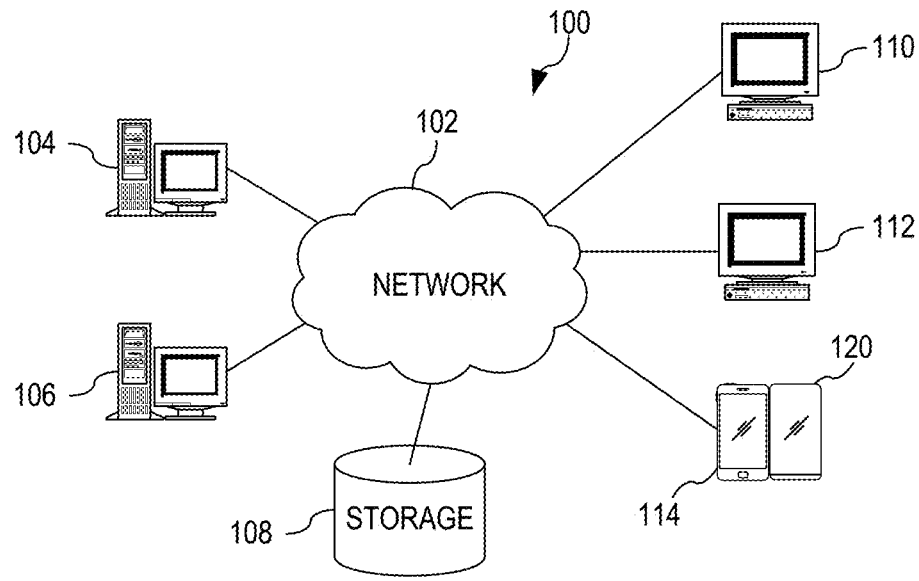
FIG. 1 depicts a pictorial representation of an example distributed data processing system in which aspects of the illustrative embodiments may be implemented.

The proliferation of portable computing devices and increased the reliance on such devices for performing a plethora of everyday tasks. Portable computing devices, such as smartphones, tablet computing devices, and the like, are used as a primary means of communication, both with regard to voice communication and electronic communication, a primary means for information collection and viewing, such as via Internet browsers, news feeds, podcasts, and the like, as well as accessing entertainment from computing sources, e.g., playing video games, watching digitally downloaded or streamed video content, etc.

As portable devices become more of a mainstay of everyday life, it is not unusual that they are increasingly being used to replace other items that human beings used to use, such as address books, notepads, calendars, personal identification, and importantly, financial instruments, such as credit cards, bank account cards, and the like. In short, portable computing devices are being used for a variety of purposes, one of which is using the portable computing device in place of a credit card to make financial transactions, such as, for example, paying for a product or service, transferring money from one user to another, withdrawing money from an account, etc.

Because people rely on their portable computing devices more heavily to perform a large number of different tasks, it is highly probable that situations will arise where the user of a portable computing device will need the portable computing device to be able to do multiple different tasks at the same time. For example, a user may need to conduct a financial transaction on a portable computing device while engaged in another activity on the portable computing device, such as a phone conversation, listening to an audio file, or the like. The various tasks are generally performed by activating software instances on the portable computing devices, e.g., applications or "apps", which perform those tasks such that the portable computing device has multiple apps executing concurrently. However, due to limitations on size of the portable computing device, being able to display multiple concurrent activities being conducted on the portable computing device is a significant issue. Typically, one primary application is able to be displayed at any given time with the other applications supporting the other tasks being performed being in the background. That is, the solution has been to either provide hidden windows for applications that can be brought back to the forefront of the display on the portable computing device, or provide small portions of the display where a user selectable element is provided to bring the display of the application back to the forefront of the display.

While portable computing devices allow a user to switch between tasks by bringing to the forefront the particular concurrently running app that they need to use, this solution has proved to be unwieldy for the user, often leading to frustration. For example, it may be difficult for a user to switch between apps in order to conduct a financial transaction while engaged in other activities on the same portable computing device. Thus, there is a need for an improved mechanism to assist users in being able to access multiple application and perform multiple tasks on the same portable computing device given the limited display size and display capabilities of the portable computing device.

In order to improve the user's experience when performing concurrent tasks on a portable computing device, illustrative embodiments of the present invention provide an intelligent screen protector that includes circuitry, data storage, and data processing logic that facilitates the performance of a variety of functions in conjunction with the portable computing device with which it is associated. The intelligence built into the intelligent screen protector via the circuitry, data storage, and data processing logic of the illustrative embodiments, allows the intelligent screen protector to operate in various modes of operation based on its connectivity to the portable computing device. For example, the intelligence built into the intelligent screen protector facilitates the intelligent screen protector operating separately from the portable computing device, such as a separate physical article used for performing a task separate, and concurrent with, tasks being performed on the portable computing device. The intelligence built into the intelligent screen protector also facilitates the intelligent screen protector operating, in a different mode of operation, as an extension of the portable computing device, such as an extension of the display area of the portable computing device, or as an additional overlay on the display, such as to provide multiple layers of display giving a sense of depth to the display from the perspective of the user. In still another mode of operation, the intelligent screen protector may operate as simply a screen protector for the portable computing device without augmenting the display of the portable computing device through any extension of the display, overlay, or separate operation apart from the portable computing device. In some illustrative embodiments, logic is provided in the portable computing device and the intelligent screen protector circuitry to facilitate the transition from one mode of operation to another, where such transitions may be based on the detection of whether or not the intelligent screen protector is physically coupled to the portable computing device.

For example, in one illustrative embodiment, the intelligent screen protector circuitry, data storage, and data processing logic (referred to collectively hereafter as the intelligent screen protector "circuitry") is programmed for operating as a selected smartcard, i.e., a card with a built-in microprocessor. The smartcard may be programmed to operate as a credit card, bank account card, driver's license or government issued identification, intelligent business card, or any other currently known or later developed smartcard article. In this way, the intelligent screen protector operates as a separate computing device to perform transactions associated with the selected smartcard, such as a financial transaction or the like. In operating as a separate smartcard device, the intelligent screen protector may be programmed to display physical characteristics of the selected smartcard on a transparent display of the intelligent screen protector, e.g., credit card number, name of the cardholder, dates of validity, etc.

In another illustrative embodiment, while attached to the portable computing device, the intelligent screen protector may be flipped to one side of the portable computing device and may be controlled to operate as an additional display area of the portable computing device, i.e., using the transparent display of the intelligent screen protector as an additional area for extending or otherwise augmenting the display of the portable computing device. The additional display area may allow for the depicting of more graphical elements, e.g., icons, "pages" of the display, and importantly, multiple application or "app" windows of concurrently executing applications. In some illustrative embodiments, the intelligent screen protector may have a touch sensitive display allowing users to touch portions of the display presented on the intelligent screen protector in order to provide an input to portable computing device.

In yet another illustrative embodiment, the intelligent screen protector provides a protective layer that covers the display of the portable computing device when not flipped to the side of the portable computing device or detached from the portable computing device. This is similar to known screen protectors and safeguards the display of the portable computing device from scratches and cracks while still allowing users to use touchscreen capabilities of the portable computing device through the transparent display of the intelligent screen protector. In some illustrative embodiments, while in this protective layer mode of operation, the intelligent screen protector may also be used as part of a depth enhanced display of the portable computing device by providing an overlay display through programming the intelligent screen protector's circuitry to provide additional display elements in closer proximity to the user than the display on the portable computing device. For example, the circuitry of the intelligent screen protector may be programmed to display icons at a different layer of depth than the icons displayed on the portable computing device, giving the user a perception of depth to the portable computing device's display. Of course, any graphical features may be provided using such a depth enhanced display and are not limited to simply displaying icons, e.g., any graphical feature where depth is desired to be shown may be implemented using the intelligent screen protector, such as giving depth to a border of a graphical user interface by outputting the border on the intelligent screen protector while other elements of the graphical user interface are displayed on the display screen of the portable computing device.

Thus, the illustrative embodiments provide an intelligent screen protector that can be used in conjunction with or separate from a computing device to enhance the display of the computing device or provide separate functionality from the computing device when detached from the computing device, while still providing the ability to operate as a screen protector. It should be appreciated that, while the improvements provided by the intelligent screen protector are especially well suited for use with portable computing devices due to their limitations on display area and displaying concurrent tasks being performed by the portable computing devices, the illustrative embodiments are not limited to such. To the contrary, the illustrative embodiments may be implemented with any computing devices having displays that can be protected by the intelligent screen protector and which may benefit from the intelligence built into the intelligent screen protector of one or more of the illustrative embodiments. Therefore, while the illustrative embodiments will be described with regard to portable computing devices, the illustrative embodiments are not limited to such.

In addition, it should be appreciated that the additional functionality and capabilities provided to the computing device by way of the intelligent screen protector will be described with regard to an example of the conducting of a financial transaction, the illustrative embodiments are not limited to such. To the contrary, the intelligent screen protector of the illustrative embodiments may operate in a variety of different ways as an extension to the display of the computing device, as an overlay of the display of the computing device, or as a separate smartcard type device programmed by the computing device to operate and perform tasks separate from the computing device with which the intelligent screen protector is initially associated. Thus, while a financial transaction with the intelligent screen protector operating as a financial smartcard, such as a credit card or banking account card, will be used for illustrative purposes, the illustrative embodiments are not limited to such and other implementations will become readily apparent to those of ordinary skill in the art in view of the present description.

Before beginning the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software executing on hardware, specifically configured hardware, and/or firmware or any combination thereof that performs the specified functions including, but not limited to, any use of a processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
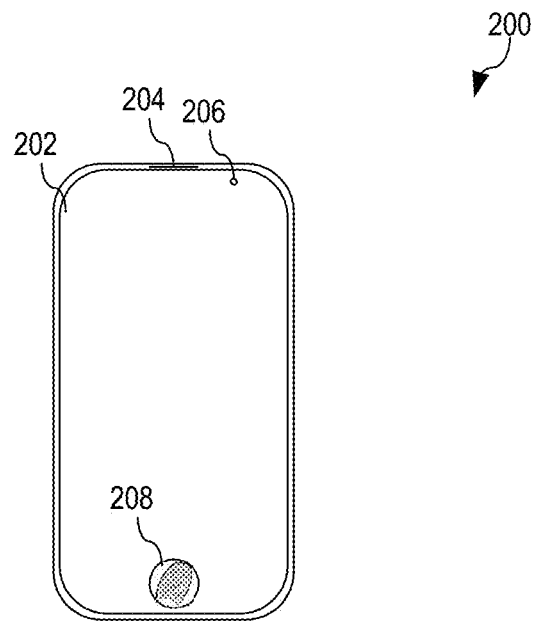
FIG. 2 depicts a pictorial representation of a client in the form of a portable computing device in accordance with a preferred embodiment of the present invention.
Figure 3:
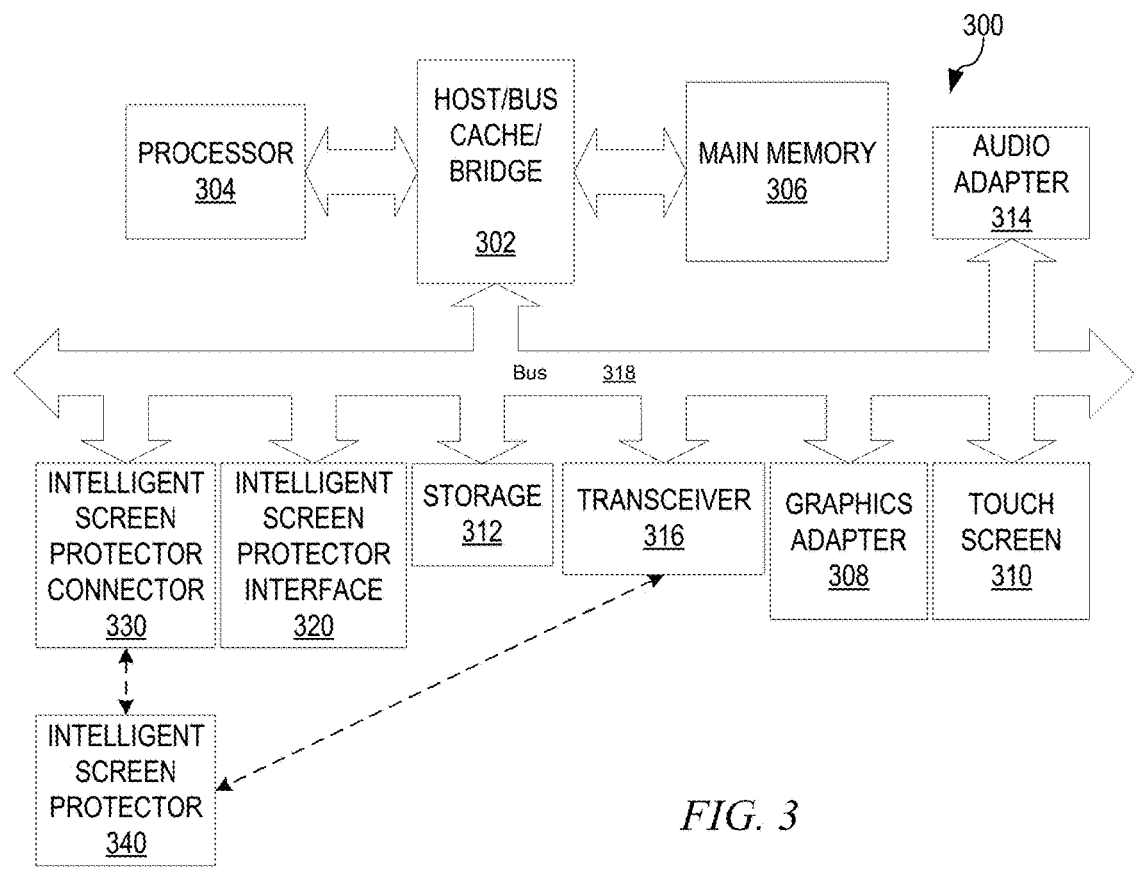
FIG. 3 depicts a block diagram of internal components of a portable computing device in accordance with a preferred embodiment of the present invention.

As noted above, the illustrative embodiments provide an intelligent screen protector for computing devices. These computing devices may take many forms, with an example being a portable computing device, such as a smartphone or tablet computing device. These computing devices may operate independently or in combination with one or more data networks in a distributed data processing environment. Thus, it can be appreciated that the illustrative embodiments may be utilized in many different types of data processing environments. In order to provide a context for the description of the specific elements and functionality of the illustrative embodiments, FIGS. 1-3 are provided hereafter as example environments with which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computing devices in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, client devices 110, 112, and 114 are also connected to network 102. These client devices 110, 112, and 114 may be, for example, portable computing devices, personal computers, network computers, or the like. In the depicted example, server 104 provides data, such as boot files, operating system images, and applications to the client devices 110, 112, and 114. Client devices 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices 110-114, e.g., client device 114, may be specifically configured to operate with an intelligent screen protector 120. The configuring of the computing device 114 and the intelligent screen protector 120 may comprise the providing of application specific hardware, firmware, or the like to facilitate the performance of the operations and generation of the outputs described herein with regard to the illustrative embodiments. The configuring of the computing device 114 and/or intelligent screen protector 120 may also, or alternatively, comprise the providing of software applications stored in one or more storage devices and loaded into memory of the computing device, such as computing device 114 and/or intelligent screen protector 120, for causing one or more hardware processors of the device to execute the software applications that configure the processor(s) to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device, e.g., computing device 114 and/or intelligent screen protector 120, is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device, e.g., computing device 114 and/or intelligent screen protector 120, and provides a useful and concrete result that facilitates the operation of an intelligent screen protector to augment the tasks and display of a computing device with which the intelligent screen protector is associated.

FIG. 2 depicts a pictorial representation of a client in the form of a portable computing device in accordance with a preferred embodiment of the present invention. Portable computing device 200 includes a display 202 for presenting textual and graphical information. Display 202 may be a known display device, such as a thin film transistor (TFT) liquid crystal display (LCD) (TFT-LCD), an In-Place Switching (IPS) liquid crystal display (LCD) (IPS-LCD), capacitive touchscreen liquid crystal display (LCD), organic light emitting diode (OLED) display, active-matrix organic light-emitting diode (AMOLED) display, or the like. The display may be used to present various types of graphical content to a user of the portable computing device 200, such as geographical maps with or without directions, electronic calendar information, a telephone directory or contacts list, electronic mail message, or any other graphical or textual output generated by one or more applications, or "apps", executed by the portable computing device 200. The portable computing device 200 may receive user input of various forms, such as audio input (e.g., spoken commands), tactile input (e.g., touch selections), or even data input from other peripheral devices, e.g., various wired or wireless peripheral devices such as a keyboard, computer mouse, light pen or smart pen device, or the like. The computing device 200 may respond to such user inputs and modify the graphical output on the display 202 in accordance with the results of processing the user input and in accordance with the particular logic of the operating system and applications or apps executing on the portable computing device 200.

As shown in FIG. 2, portable computing device 200 may also include a speaker 204, a camera 206, and authorization area/input device (e.g., button or touch sensitive area) 208, or the like. Speaker 204 provides a mechanism for audio output, such as presentation of an audio file, phone conversation, or the like. Camera 206 provides a mechanism for image capture, facial recognition, or the like. Authorization area/input device 208 provides a mechanism for establishing fingerprint authorization for phone usage, selection of inputs, or the like. While not illustrated, portable computing device 200 also comprises an internal antenna for a wireless communications link between portable computing device 200 and one or more networks, such as network 102 in FIG. 1. The portable computing device 200 may include other elements not explicitly shown, but which will be readily apparent to those of ordinary skill in the art.

In the depicted example, the portable computing device 200 is a smartphone device, but is not limited to such, and may be any type of computing device, portable of otherwise, having a display screen with which the intelligent screen protector of the illustrative embodiments may be utilized. For example, the portable computing device 200 may be a tablet computing device, a laptop computing device, a wearable technology computing device, such as an activity tracker, health tracker, smartwatch, or the like. For simplicity of the present description, the examples will assume a smartphone device as a non-limiting example.

As noted above, the mechanisms of the illustrative embodiments utilize specifically configured computing devices, or data processing systems, to perform the operations for implementing an intelligent screen protector. These computing devices, or data processing systems, may comprise various hardware elements which are specifically configured, either through hardware configuration, software configuration, or a combination of hardware and software configuration, to implement one or more of the systems/subsystems described herein. In particular, the computing devices or data processing systems, have hardware and/or software specifically configured to implement functionality and controls of functionality with regard to the operations of an intelligent screen protector both when the intelligent screen protector is physically coupled to the computing device or data processing system, such as coupled to the portable computing device 200 in FIG. 2, and when the intelligent screen protector is physically de-coupled from the computing device or data processing system. Hardware and/or software configurations are able to detect such physical coupling/de-coupling and control the display and functionality of the intelligent screen protector in response to such detections and in conjunction with the particular tasks being performed by the operating system, applications or apps, etc. of the computing device or data processing system.

FIG. 3 depicts a block diagram of a portable computing device in accordance with one illustrative embodiment of the present invention. Portable computing device 300 is an example of a smartphone, such as portable computing device 200 in FIG. 2. Portable computing device 300 includes a host/bus cache/bridge 302 to which processor 304 and main memory 306 are connected. Graphics adapter 308, touch screen adapter 310, storage 312, audio adapter 314, and transceiver 316 are also are connected to bus 318. Graphics adapter 308 generates a feed of output images to a display of portable computing device 300. Touch screen adapter 310 receives user input from a user's finger or thumb when a touch screen display is employed. Audio adapter 314 records and plays back sound via a microphone or speaker. Transceiver 316 transmits and receives information through a transmission medium, which may include radio transmissions, infrared transmissions, electrical signals along a wired connection, or any other wired or wireless transmission. It should be appreciated that while a single transceiver 316 is shown, the transceiver 316 may in fact comprise multiple different transceivers 316 for sending/receiving data and control signals via various transmission media and using various different types of transmission protocols.

An operating system runs on processor 304 and is used to coordinate and provide control of various components within portable computing device 300. The operating system may be, for example, a commercially available operating system such as Android™ from Google®, iOS™ from Apple®, or the like. Instructions for the operating system and applications or programs are located on storage devices, such as storage 312, and may be loaded into main memory 306 for execution by processor 304.

As shown in FIG. 3, in accordance with one or more illustrative embodiments, the portable computing device 300 further includes an intelligent screen protector interface 320 and intelligent screen protector connector 330. The intelligent screen protector interface 320 provides hardware and/or software logic to detect the coupling/de-coupling of the intelligent screen protector 340 to/from the portable computing device 300, such as a coupling/de-coupling with the intelligent screen protector connector 330. The intelligent screen protector interface 320 also comprises logic for controlling the flow and communication of data to/from the intelligent screen protector 340 through the intelligent screen protector connector 330 and/or via transceiver 316. The controlling of this flow of data may be to direct data communications through a physical connection when the intelligent screen protector 340 is coupled to the portable computing device 300 via the intelligent screen protector connector 330, for example, and/or to direct data communications through a wireless connection via transceiver 316 when the intelligent screen protector 340 is de-coupled from the portable computing device 300, for example. The content displayed by, and the functionality imparted to, the circuitry of the intelligent screen protector 340 may be dependent upon the particular operations of the operating system and/or applications executing on the portable computing device 300, such as may be loaded into main memory 306 and executed by processor 304, for example.

In accordance with at least one illustrative embodiment, the intelligent screen protector connector 330 may include, for example, an electronically controlled magnetic hinge-based locking mechanism, which may have one or more sensors (not shown) to detect magnetic coupling/de-coupling of the intelligent screen protector and communicate the current coupling state to the intelligent screen protector interface 320 via the bus 318. The intelligent screen protector connector 330 may also have data communication pins or ports, or other physical communication interfaces for data communication, that may be automatically engaged with complementary pins or ports of the portable computing device when the intelligent screen protector is coupled to the portable computing device 300. The physical connection provides a data communication pathway that may be used while the intelligent screen protector 340 is coupled to the portable communication device 300. When the intelligent screen protector 340 is de-coupled from the portable computing device 300, a wireless connectivity may be utilized for data communications, such as via the transceiver 316. Other mechanisms for coupling/de-coupling the intelligent screen protector may also be used to implement the intelligent screen protector connector 330, as will be readily apparent to those of ordinary skill in the art in view of the present description, without departing from the spirit and scope of the present invention.

Those of ordinary skill in the art will appreciate that the hardware in FIG. 3 may vary depending on the implementation, without departing from the spirit and scope of the present invention, and FIG. 3 is only an example. Other internal hardware or peripheral devices, such as flash ROM (or equivalent nonvolatile memory), solid state drives (SSDs), optical disk drives, and the like, may be used in addition to or in place of the hardware depicted in FIG. 3. Moreover, for each element shown in FIG. 3, while a single element is shown, it can be appreciated that these elements may in fact comprise a plurality of elements of similar type operating separate or on conjunction with one another, e.g., while a single processor 304 is shown in FIG. 3, this processor 304 may in fact comprise a plurality of processors such that a multi-processor configuration of the portable computing device 300 is implemented.

Furthermore, it should be appreciated that while the computing device 300 is described as a portable computing device, such as a smartphone computing device, the computing device, or data processing system, may take the form of any of a number of different types of computing devices/data processing systems including client computing devices, server computing devices, a tablet computer, laptop computer, telephone, portable computing device, or the like. Essentially, the data processing system may be any known or later developed data processing system without architectural limitation.

Figure 4:
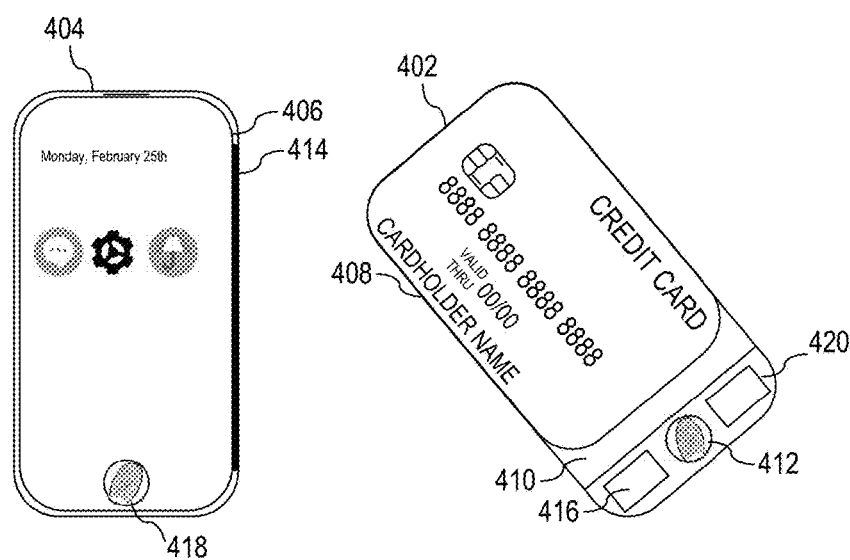
FIG. 4 depicts one illustration of an intelligent screen protector operating as a selected smartcard in accordance with an illustrative embodiment.

FIG. 4 depicts one illustration of an intelligent screen protector operating as a selected smartcard in accordance with an illustrative embodiment. Initially, it should be appreciated that the intelligent screen protector 402 is coupled to the portable computing device 404 via an intelligent screen protector connector 414, which in this example is considered to be an electronically controlled magnetic hinge-based lock 414. Through this connector 414, data communication may be made possible while the intelligent screen protector 402 is coupled to portable computing device 404, such as via data communication pins or the like. A user may interface with the touch screen display of the portable computing device 404 while the intelligent screen protector 402 is coupled to the portable computing device 404 with the intelligent screen protector 402 providing physical protection of the display screen with regard to scratches and impacts. Moreover, in some illustrative embodiments, the intelligent screen protector interface 320 in FIG. 3 may drive a graphical display of the intelligent screen protector 402 while coupled, such as via data communication pathway provided via the connector 414, to provide a depth enhanced display for the portable computing device 404, such as by display different graphical elements at the depth of the intelligent screen protector 402 while other graphical elements are displayed on the display of the portable computing device 404 at a different depth relative to the eye of the user.

The intelligent screen protector 402 comprises circuitry 416 which may include wireless communication capability. As a result, the intelligent screen protector 402 may undergo a pairing or wireless handshake operation to configure and enable a wireless communication between the intelligent screen protector 402 and the portable computing device 404. This pairing or handshake operation may be automatically initiated in response to detection, via sensors in the connector 414, that the intelligent screen protector 402 has been de-coupled from the connector 414, for example. Thus, data communication between the portable computing device 404 and the intelligent screen protector may seamlessly transition from a physical data connection via the connector 414 to a wireless communication connection via a wireless transceiver, such as transceiver 316 in FIG. 3. Alternatively, in some illustrative embodiments, the data communication may occur via wireless communication regardless of whether the intelligent screen protector 404 is coupled to, or de-coupled from, the portable computing device 402.

In the depiction of FIG. 4, intelligent screen protector 402 is assumed to have already been paired with portable computing device 404 via a wireless communication protocol pairing operation, and now has been detached from portable computing device 404, resulting in the separate operations of the portable computing device 404 and the intelligent screen protector 402 as shown in the figure. In order to detach intelligent screen protector 402, a user of portable computing device 404 applies a specific function that releases electronically controlled magnetic hinge-based lock 414 that couples intelligent screen protector 402 to portable computing device 404. This specific function may be the user selecting a particular icon or control via the graphical user interface of the display of the portable computing device 404, a physical detaching of the intelligent screen protector 402 from the connector 414, such as through a gentle pulling operation to disengage a magnetic attraction of the magnets in a magnetic lock of the connector 414, or the like. For example, one edge 406 of portable computing device 404 may comprise a connector 414, which in this example is an electronically controlled magnetic hinge-based lock 414, that couples to an edge, for example edge 408, of the intelligent screen protector 402. Magnetic elements in the connector 414 and the edge 408 of the intelligent screen protector 402 may be configured to engage each other when they are in close proximity to one another, but such that the magnetic attraction force of these magnetic elements may be overcome by physical force exerted by the user to increase the distance between these magnetic elements beyond a range where the magnets are significantly attracted to each other. Once the specific function has been applied by the user, either via an operation via the graphical user interface or the application of a physical force to the physical (e.g., magnetic) locking mechanism, portable computing device 404 releases connection between the portable computing device 404 and the intelligent screen protector 402, e.g., the connection of the electronically controlled magnetic hinge-based lock 414 is released, so that intelligent screen protector 402 operates as a separate computing device from the portable computing device 404, but having been programmed by portable computing device 404 and may be in wireless communication with the portable computing device 404.

In one illustrative embodiment of the present invention, intelligent screen protector 402 comprises another instance 416 of circuitry 300 shown in FIG. 3 (or at least certain aspects of circuitry 300), where circuitry 416 includes a battery and may include a processor. Circuitry 416 provides logic configured to control the display of digital content in a transparent display area 410 via transparent display technology, such as that used in transparent liquid crystal display (LCD) screens, transparent organic light-emitting diode (OLED) screens, or the like. In one illustrative embodiment, once intelligent screen protector 402 is detached from portable computing device 404, portable computing device 404 may program and communicate data to/from the intelligent screen protector 402 via Near Field Communications, Bluetooth, or the like, such as by using a set of rules and data to operate the intelligent screen protector 402 as a selected smartcard, for example.

The programming of the intelligent screen protector 402 may be subject to security measures implemented by the logic of the portable computing device 404, e.g., intelligent screen protector interface 320 in FIG. 3, to control the way in which the intelligent screen protector 402 may be used apart from the portable computing device 404. The security measures may be executed on the portable computing device 404 and/or may be programmed into the intelligent screen protector 402 circuitry. For example, these security measures may comprise rules/data for performing various types of encryption, authentication, and the like, and may specify a subset of devices that the intelligent screen protector 402 may operate as, in an effort to maintain the privacy of the information programmed into the intelligent screen protector 402, displayed by the intelligent screen protector 402, and communicated by the intelligent screen protector 402, as well as protect sensitive information stored in the portable computing device 404.

For example, for each of a set of smartcards that the user has the potential to display on transparent display area 410 of intelligent screen protector 402, the rules may specify which smartcards may be used with intelligent screen protector 402 and which smartcards may not be used with intelligent screen protector 402. That is, the user may register the portable computing device 404 with profiles for a plurality of different smartcards, yet may control which smartcards may be represented on the intelligent screen protector 402. For those smartcards that may be used with intelligent screen protector 402, the rules may operate in conjunction with the profiles for the smartcards to determine which smartcards have parameters that require fingerprint authentication using fingerprint sensor 412. The rules/profile may further determine which of those smartcards have parameters for the use of machine readable barcode, Quick Response (QR) code, or the like. The rules/profiles may further determine which of those smartcards have parameters for the use of magnetic fields for touch or swipe capabilities associated with the selected smartcard, such as may be used with credit card magnetic stripes or the like. These rules/profile examples are only exemplary and many other rules/profile data are anticipated without departing from the spirit and scope of the present invention.

Thus, in an example where intelligent screen protector 402 displays a smartcard, intelligent screen protector 402 receives instruction from portable computing device 404 identifying a smartcard selected by the user as well as authentication and operation parameters associated with the selected smartcard. Once intelligent screen protector 402 receives an identification of the selected smartcard, logic in the circuitry 416 of the intelligent screen protector 402 analyzes the parameters and implements one or more of requiring authentication via fingerprint sensor 412, or the fingerprint sensor 418 on the portable computing device 404, in order to display the smartcard in transparent display area 410; identifying whether the selected smartcard requires a machine readable barcode, QR code, or the like, to be displayed in transparent display area 410; identifying whether a magnetic field needs to be generated for the selected smartcard; or the like. Once the logic in circuitry 416 of the intelligent screen protector 402 analyzes the parameters and identifies the required parameters and authentication has been verified (if necessary), the logic in the circuitry 416 of the intelligent screen protector 402 drives the graphical display elements of the transparent display technology to visually create an image of the selected smartcard in transparent display area 410, so that the user can easily identify which card is displayed in the transparent display screen of the intelligent screen protector 402. Intelligent screen protector 402 generates an image of the smartcard such that all necessary information to recognize the smartcard will be identified. This includes, if required by the provided parameters associated with the smartcard, a machine readable barcode, QR code, or the like, able to be scanned a point of sale (POS) terminal. In the depicted example, the transparent display area 410 is controlled to generate a graphical display resembling a physical credit card. The data for generating the display may be communicated to the intelligent screen protector 402 from the portable computing device 402 via the wireless communication in response to the user selecting the smartcard to be represented on the intelligent screen protector 402.

In addition to generating the image of the smartcard, intelligent screen protector 402 may also, if required by the provided parameters associated with the smartcard, generate a magnetic field via a magnetic coil 420 for the use of magnetic fields for touch or swipe capabilities associated with the selected smartcard. Based on the selected smartcard, the magnetic coil 420 creates an appropriate magnetic field so that intelligent screen protector 402 is utilized as a smartcard would be used and perform transactions via touch or swipe capabilities associated with the selected smartcard.

In one embodiment, intelligent screen protector 402 continues to visually create the image of the selected smartcard in the transparent display area 410 and (if required) the generation of the magnetic field until the smartcard has been used for the financial transaction for which it was generated. Once the transaction has been initiated, or in response to a transaction complete message being received by the logic of the circuitry 416, such as from a card reader or the like, then intelligent screen protector 402 stops the visual creation of the image of the selected smartcard in transparent display area 410 and (if required) the generation of the magnetic field. In another embodiment, intelligent screen protector 402 uses a timeout feature programmed into, or built into, the circuitry 416, where intelligent screen protector 402 stops the visual creation of the image of the selected smartcard in transparent display area 410 once a predetermined time has been met after initial generation of the image of the smartcard.

At any point of time, the user can change programming of intelligent screen protector 402, such as via user input to the portable computing device 404, such that when intelligent screen protector 402 receives a selection of a new smartcard, intelligent screen protector 402 analyzes the new parameters and one authentication is approved (if required, the new smartcard and required parameters, i.e. machine readable barcode, QR code, magnetic field are displayed/generated. In some illustrative embodiments, the intelligent screen protector 402 may be programmed by the portable computing device 404 to operate as a plurality of smartcards with corresponding different displays and/or magnetic fields with the user being able to cycle through the various smartcards in the plurality of smartcards, such as by touching a designated area of the intelligent screen protector 402 and/or a designated area of the portable computing device 404.

It is of particular note that, when security measures are in place and intelligent screen protector 402 identifies an unauthorized use of intelligent screen protector 402, such as a failure to authenticate a fingerprint of the user using intelligent screen protector 402 via fingerprint sensor 412, then intelligent screen protector 402 will lock with no information displayed in transparent display area 410 until intelligent screen protector 402 is once again coupled to the paired portable computing device 404. This ensures that the individual in possession of the intelligent screen protector 402 is also in possession of the portable computing device 404 and thus, is more likely to be an authorized user of the intelligent screen protector 402. In order to ensure that the intelligent screen protector 402 is being coupled to the particular portable computing device 404 that it is associated with, security mechanism may be employed to authenticate both the intelligent screen protector 402 and the portable computing device 404 to each other such that the intelligent screen protector 402 cannot be coupled to another portable computing device 404 with which it is not associated and have the intelligent screen protector 402 unlocked. For example, authentication of MAC addresses, security keys, or the like, may be employed to authenticate the devices to one another. In some illustrative embodiments, additional security may be employed where the intelligent screen protector 402 may not be unlocked until it is coupled to the portable computing device 404 and the user of the portable computing device 404 unlocks the portable computing device 404, such as through facial recognition, entering of a personal identification number (PIN), entering of a password, or other authentication mechanism, and the portable computing device is authenticated with the intelligent screen protector 402.

Thus, as described in FIG. 4, the intelligent screen protector 402 may operate as a separate, but associated, entity from the portable computing device 404. That is, once programmed by the portable computing device 404, the intelligent screen protector 402, de-coupled from the portable computing device 404, may operate independently as a smartcard. This is one mode of operation in which the intelligent screen protector 402 may operate as an extension of the portable computing device 404. As noted previously, an additional mode of operation for extending the functionality of the portable computing device 404 is to implement the intelligent screen protector as an extension of the display of the portable computing device 404 or as an additional display of the portable computing device 404.

Figure 5:
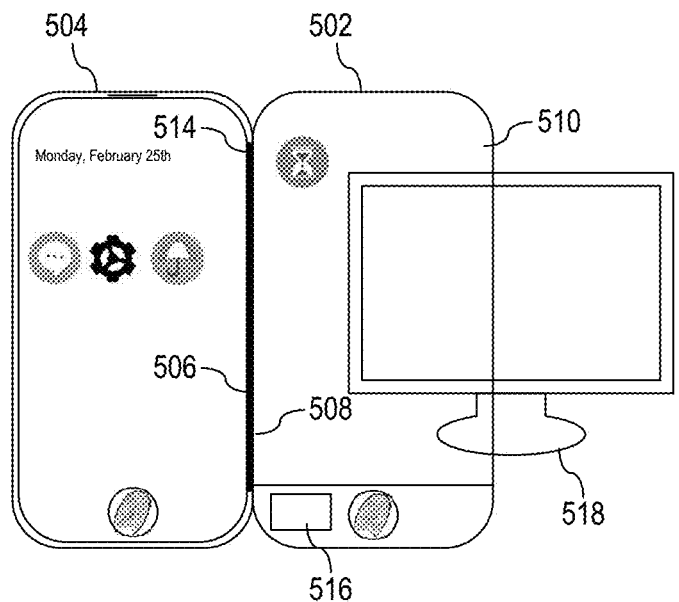
FIG. 5 depicts one illustration of an intelligent screen protector operating as an additional display area in accordance with an illustrative embodiment.

FIG. 5 depicts an intelligent screen protector operating as an additional or extended display area in accordance with one illustrative embodiment. In this illustration, intelligent screen protector 502 is attached to portable computing device 504 and is in data communication with the portable computing device 504 through either physical data communication connections, e.g., data communication pins, or wireless data communication, such as previously described above. In order to attach intelligent screen protector 502, a user of portable computing device 504 applies a specific function (either through user input to the graphical user interface or through physical effort to physically attach the intelligent screen protector 502) that engages electronically controlled magnetic hinge-based lock 514 that couples intelligent screen protector 502 to portable computing device 504. For example, as discussed previously, one edge 506 of portable computing device 504 may comprise electronically controlled magnetic hinge-based lock 514 that couples to an edge 508 of the intelligent screen protector 502.

Once the specific function has been applied by the user, portable computing device 504 engages electronically controlled magnetic hinge-based lock 514 so that, in this illustrative embodiment, when intelligent screen protector 502 is not covering portable computing device 504, the intelligent screen protector 502 operates as an additional display area for the graphical output of portable computing device 504. That is, intelligent screen protector 502 is rotatable via the electronically controlled magnetic hinge so that it opens, but is not physically de-coupled from portable computing device 504. The rotation of the hinged connection may be detected by sensors present in the connector 514 so as to determine whether the intelligent screen protector 502 is in a position that overlays the display of the portable computing device 504 or is rotated away from the display of the portable computing device 504. The transparent display area 510 uses transparent display technology, such as that used in transparent liquid crystal display (LCD) screens, transparent organic light-emitting diode (OLED) screens, or the like, and can generate graphical outputs that may be used to extend the display of the portable computing device 504 or provide a second display for the portable computing device 504. The transparency of transparent display are 510 is shown in FIG. 5 by the ability to view object 518 through the transparent display area 510.

In operating as the additional transparent display area 510, intelligent screen protector 502 receives commands from portable computing device 504, such as from a graphics adapter 308 in FIG. 3, and displays digital content in additional transparent display area 510. As with the embodiment shown in FIG. 4, intelligent screen protector 502 comprises another instance 516 of circuitry 300 shown in FIG. 3 (or at least certain aspects of circuitry 300), where circuitry 516 includes a battery and may include a processor. Circuitry 516 provides for intelligent screen protector 502 to display the additional digital content based on commands/data sent to it from the portable computing device 502, such as via physical connection through connector 330 in FIG. 3, for example, or through a wireless data communication connection.

Figure 6:
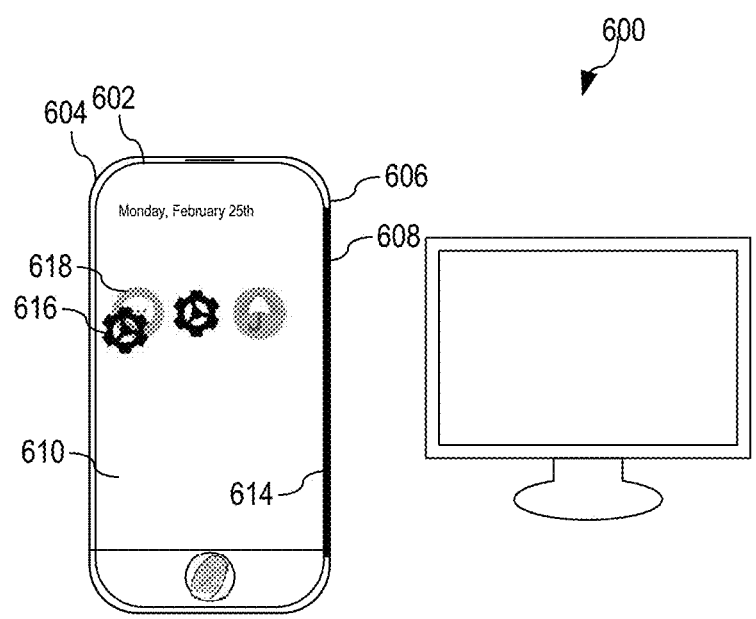
FIG. 6 depicts one illustration of an intelligent screen protector operating as screen protector for a portable computing device in accordance with an illustrative embodiment.

FIG. 6 depicts one illustration of an intelligent screen protector operating as screen protector for a portable computing device in accordance with an illustrative embodiment. In this illustration, intelligent screen protector 602 is attached to portable computing device 604, such as via the physical connector, e.g., electronically controlled magnetic hinge-based lock 614, which may include a data connection. Alternatively, the connector may not be utilized for data communication and instead the intelligent screen protector 602 may be paired with the portable computing device 604 for wireless communication, as discussed previously. Once the intelligent screen protector 602 is coupled to the portable computing device 604 and the intelligent screen protector is not rotated away from the display of the portable computing device 604, as determined from sensors in the connector 614 as discussed previously, the intelligent screen protector 602 operates as a screen protector for the display of portable computing device 604. In this mode, intelligent screen protector 602 operates as a protective surface for the display of portable computing device 604 protecting portable computing device 604 from scratches, cracks, or the like. Further, in this mode, intelligent screen protector 602 provides detection of touches by the user so that those touches are transferred thru to the display of portable computing device 604 as well as providing transparency so that the user is able to view the content of portable computing device 604 through the transparent display area 610.

In addition, in accordance with one or more illustrative embodiments in which a double layered transparent display screen technology is utilized, while the intelligent screen protector 602 is coupled to the portable computing device 604 and the intelligent screen protector 602 is not rotated away from the display, but rather overlays the display of the portable computing device 604, a depth enhanced display output is made possible by the intelligent screen protector 602. That is, as shown in FIG. 6, graphical elements of the display of the portable computing device 604 may be displayed on the intelligent screen protector 602 at a different depth than the depth at which the display of the portable computing device 604 is relative to the user's eye. In this way, graphical and/or textual elements in a graphical user display of the portable computing device 604 may appear closer or further away from the user's eye depending on whether the graphical/textual element is displayed on the display of the portable computing device 604 or on the intelligent screen protector 602 which overlays the display of the portable computing device 604. Thus, for example, as shown in FIG. 6, icon 616, which is displayed on the intelligent screen protector 602, appears to overlay and be at a closer depth to the user's eye than the icon 618 which is output on the display of the portable computing device 604. The display of the portable computing device 604 is still perceivable through the transparent intelligent screen protector 602 while providing additional graphical/textual elements output on the intelligent screen protector 602. In this way, visual effects giving the user the perception of depth are made possible using two-dimensional displays of the portable computing device 604 and the intelligent screen protector 604.

It should be appreciated that the various modes of operation of the intelligent screen protector have been described above as separate modes of operation, however the illustrative embodiments are not limited to such. The mechanisms of the illustrative embodiments may seamlessly transition from one mode of operation to another based on the detected state of the intelligent screen protector relative to the portable computing device. This detection of state may be based on sensors in the connector between the intelligent screen protector and the portable computing device, as well as may be determined based on user input to the portable computing device, for example. Thus, for example, the mechanisms of the illustrative embodiments can detect when the intelligent screen protector is coupled to the portable computing device and is overlaying the display of the portable computing device, can detect that the intelligent screen protector is coupled to the portable computing device, but has been rotated away from the display of the portable computing device, and can detect when the intelligent screen protector is detached or de-coupled from the portable computing device and thus, is operating as a separate device. Based on the detection of the particular state, the operation of the intelligent screen protector and portable computing device may be automatically modified to operate in a corresponding mode of operation.

As is apparent from the above describe of the various illustrative embodiments, depending on the desired implementation, the illustrative embodiments of the present invention may be embodied as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
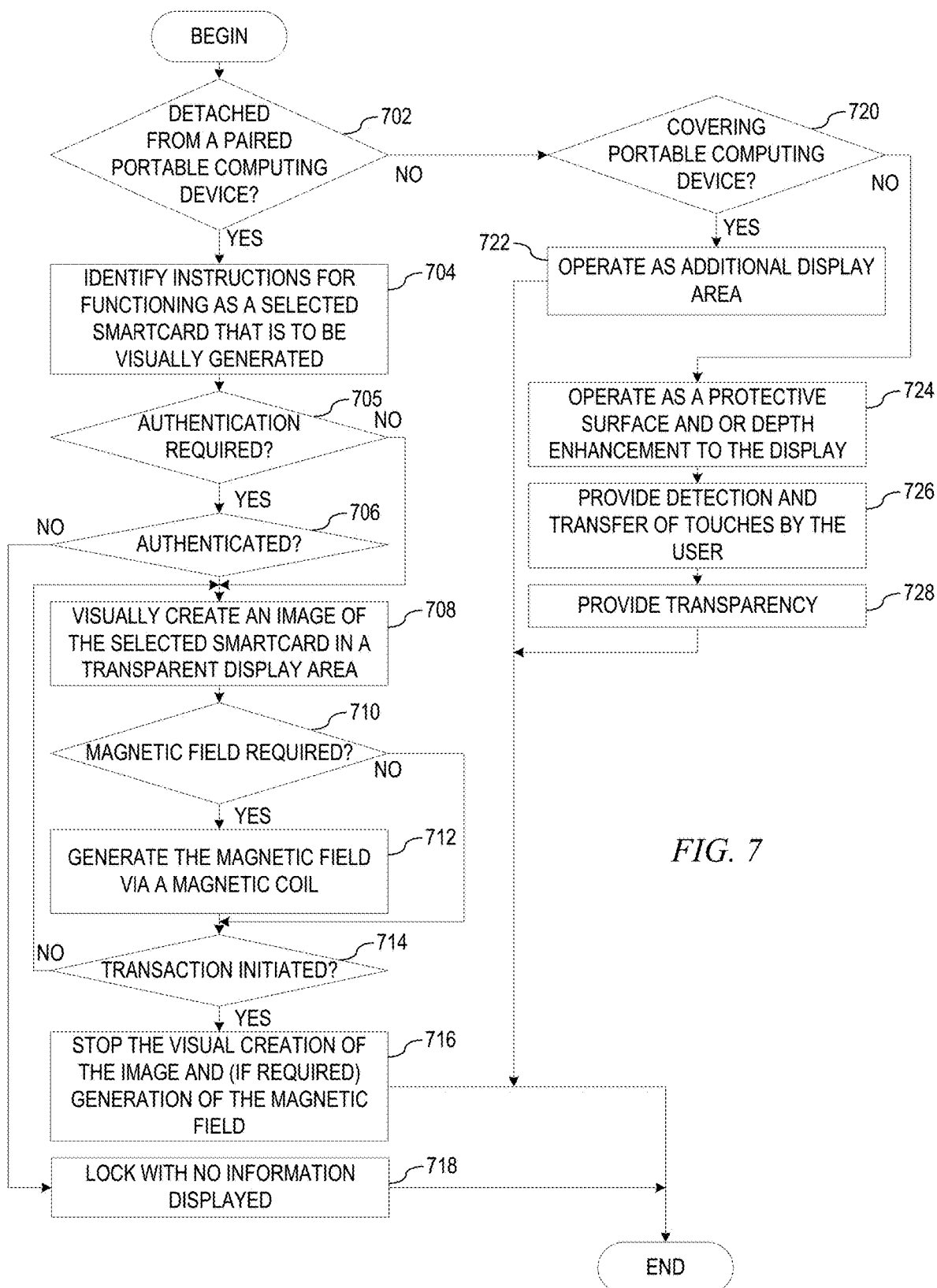
FIG. 7 depicts one example of a flow diagram depicting the operation performed by an intelligent screen protector in accordance with an illustrative embodiment.

FIG. 7 depicts one example of a flow diagram depicting the operation performed by an intelligent screen protector in accordance with an illustrative embodiment. The operation outlined in FIG. 7 is only an example operation of one illustrative embodiment and is not intended to be exhaustive of the operations or limiting of the operations of other illustrative embodiments. FIG. 7 is provided only as a non-limiting example.

As shown in FIG. 7, as the operation beings the intelligent screen protector determines whether the intelligent screen protector has been detached or de-coupled from a paired portable computing device (step 702). If at step 702 the intelligent screen protector is detached or de-coupled from the paired portable computing device, the intelligent screen protector identifies the instructions, e.g., rules and/or data from a smartcard profile, for functioning as a selected smartcard that is to be visually generated on the intelligent screen protector (step 704). The instructions provide parameters of the selected smartcard that may include but are not limited to requiring authentication via fingerprint sensor in order to display the selected smartcard; whether the selected smartcard requires an associated machine readable barcode, QR code, or the like, to be displayed; whether a magnetic field need to be generated for the selected smartcard; or the like.

The intelligent screen protector determines whether authentication is required for enabling operation of the intelligent screen protector as the selected smartcard (step 705). If at step 705 authentication is required, the intelligent screen protector prompts the user of the intelligent screen protector for authentication (step 706). If at step 706 the user is authenticated or if at step 705 authentication is not required, the intelligent screen protector visually creates an image of the selected smartcard in a transparent display area so that user can easily identify which card is displayed in the transparent display screen (step 708). The intelligent screen protector generates an image of the smartcard such that all necessary information to recognize the smartcard will be identified. This includes, if required by the provided parameters associated with the smartcard, a machine readable barcode, QR code, or the like, able to be scanned a point of sale (POS) terminal, or if required. The intelligent screen protector also determines whether a magnetic field is required (step 710). If at step 710 a magnetic field is required, the intelligent screen protector generates the magnetic field via a magnetic coil (step 712).

From step 712, or if at step 710 the magnetic field is not required, the intelligent screen protector continues to visually create the image of the selected smartcard in the transparent display area and (if required) the generation of the magnetic field until the smartcard has been used for the financial transaction for which it was generated (step 714). If at step 714 the transaction has not been initiated, the operation returns to step 708. If at step 714 the transaction has been initiated, then the intelligent screen protector stops the visual creation of the image of the selected smartcard in the transparent display area and (if required) the generation of the magnetic field (step 716), with the operation terminating thereafter. If at step 706 the user is not authenticated, the intelligent screen protector locks with no information displayed until intelligent screen protector is once again coupled to the paired portable computing device (step 718), with the operation terminating thereafter.

If at step 702 the intelligent screen protector is attached from the paired portable computing device, the intelligent screen protector determines whether the transparent display area of the intelligent screen protector is covering the portable computing device (step 720). If at step 720 the transparent display area of the intelligent screen protector is not covering the portable computing device, the intelligent screen protector operates as an additional display area for the portable computing device (step 722), with the operation terminating thereafter. If at step 720 the transparent display area of the intelligent screen protector is covering the portable computing device, the intelligent screen protector operates as a protective surface for the display of the portable computing device and/or may operate as a depth enhancement to the display of the portable computing device (step 724). The protective surface protects the display of the portable computing device from scratches, cracks, or the like, but still allows the display of the portable computing device to detect touches by the user (step 726) so that those touches are transferred through to the display area of the portable computing device as well as providing transparency (step 728) so that the user is able to view the content of the portable computing device through the transparent display area. The operation terminates thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for an intelligent screen protector that functions in a variety of ways and improves the user's experience when performing multiple tasks using a portable computing device. In one embodiment, the intelligent screen protector circuitry is programmed for operating as a selected smartcard. In this way, the intelligent screen protector operates as a separate computing device to perform financial transactions associated with the selected smartcard, which may include displaying the selected smartcard on a transparent display of the intelligent screen protector. In another embodiment, while attached to the portable computing device, the intelligent screen protector is flipped to the side of the portable computing device and provides an additional display area of the portable computing device, i.e. using the transparent display of the intelligent screen protector. In yet another embodiment, the intelligent screen protector provides a protective layer that covers the display of the portable computing device when not flipped to the side of the portable computing device, which safeguards the screen from scratches and cracks while still allowing users to use touchscreen capabilities of the portable computing device through the transparent display of the intelligent screen protector.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for an intelligent screen protector, the method comprising:
    responsive to the intelligent screen protector being detached from a paired portable computing device, identifying, by the intelligent screen protector, a set of instructions received from the paired portable computing device associated with visually generating an image of a selected smartcard;
    in accordance with the set of instructions, visually generating, by the intelligent screen protector, the image of the selected smartcard in a transparent display area of the intelligent screen protector;
    determining, by the intelligent screen protector, whether a transaction associated with the selected smartcard has been initiated; and
    responsive to the transaction associated with the selected smartcard being initiated, discontinuing, by the intelligent screen protector, the visual generation of the image of the selected smartcard in the transparent display area of the intelligent screen protector.

2. The method of claim 1, further comprising:
    responsive to the set of instruction indicating that authentication of a user of the intelligent screen protector is required, prior to visually generating the image of the selected smartcard in the transparent display area of the intelligent screen protector, prompting, by the intelligent screen protector, the user of the intelligent screen protector for authentication via the intelligent screen protector; and
    responsive to the user of the intelligent screen protector providing authentication via the intelligent screen protector, visually generating, by the intelligent screen protector, the image of the selected smartcard in the transparent display area of the intelligent screen protector.

3. The method of claim 1, further comprising:
    responsive to the set of instruction indicating a machine readable barcode or Quick Response (QR) code is required for the transaction, generating, by the intelligent screen protector, the machine readable barcode or the QR code associated with the selected smartcard in the transparent display area of the intelligent screen protector.

4. The method of claim 1, further comprising:
    responsive to the set of instruction indicating magnetic field is required for the transaction, generating, by the intelligent screen protector, the magnetic field associated with the selected smartcard via the intelligent screen protector.

5. The method of claim 1, wherein the intelligent screen protector is detached from the paired portable computing device via an electronically controlled magnetic hinge-based lock that couples the intelligent screen protector to the paired portable computing device.

6. The method of claim 1, further comprising:
    responsive to the intelligent screen protector being attached to the paired portable computing device and responsive to the intelligent screen protector not covering the paired portable computing device, displaying, by the intelligent screen protector, additional content of the portable computing device in a transparent display area of the intelligent screen protector.

7. The method of claim 1, further comprising:
    responsive to the intelligent screen protector being attached to the paired portable computing device and responsive to the intelligent screen protector covering the paired portable computing device, providing one or more of:
- a protective surface for the display of the paired portable computing device;
- detection and transfer of touches by the user to the intelligent screen protector to the paired portable computing device; or
- viewing of content of the paired portable computing device through a transparent display area of the intelligent screen protector.

8. A computer program product comprising a non-transitory computer readable storage medium having a computer readable program stored therein, wherein the computer readable program, when executed on a computing device, causes the computing device to:
- responsive to an intelligent screen protector being detached from a paired portable computing device, identify a set of instructions received from the paired portable computing device associated with visually generating an image of a selected smartcard;
- in accordance with the set of instructions, visually generate the image of the selected smartcard in a transparent display area of the intelligent screen protector;
- determine whether a transaction associated with the selected smartcard has been initiated; and
- responsive to the transaction associated with the selected smartcard being initiated, discontinue the visual generation of the image of the selected smartcard in the transparent display area of the intelligent screen protector.

9. The computer program product of claim 8, wherein the computer readable program further causes the computing device to:
- responsive to the set of instruction indicating that authentication of a user of the intelligent screen protector is required, prior to visually generating the image of the selected smartcard in the transparent display area of the intelligent screen protector, prompt the user of the intelligent screen protector for authentication via the intelligent screen protector; and
- responsive to the user of the intelligent screen protector providing authentication via the intelligent screen protector, visually generate the image of the selected smartcard in the transparent display area of the intelligent screen protector.

10. The computer program product of claim 8, wherein the computer readable program further causes the computing device to:
- responsive to the set of instruction indicating a machine readable barcode or Quick Response (QR) code is required for the transaction, generate the machine readable barcode or the QR code associated with the selected smartcard in the transparent display area of the intelligent screen protector.

11. The computer program product of claim 8, wherein the computer readable program further causes the computing device to:
- responsive to the set of instruction indicating magnetic field is required for the transaction, generate the magnetic field associated with the selected smartcard via the intelligent screen protector.

12. The computer program product of claim 8, wherein the intelligent screen protector is detached from the paired portable computing device via an electronically controlled magnetic hinge-based lock that couples the intelligent screen protector to the paired portable computing device.

13. The computer program product of claim 8, wherein the computer readable program further causes the computing device to:
- responsive to the intelligent screen protector being attached to the paired portable computing device and responsive to the intelligent screen protector not covering the paired portable computing device, display additional content of the portable computing device in a transparent display area of the intelligent screen protector.

14. The computer program product of claim 8, wherein the computer readable program further causes the computing device to:
- responsive to the intelligent screen protector being attached to the paired portable computing device and responsive to the intelligent screen protector covering the paired portable computing device, provide one or more of:
- a protective surface for the display of the paired portable computing device;
- detection and transfer of touches by the user to the intelligent screen protector to the paired portable computing device; or
- viewing of content of the paired portable computing device through a transparent display area of the intelligent screen protector.

15. An apparatus comprising:
a processor; and
a memory coupled to the processor, wherein the memory comprises instructions which, when executed by the processor, cause the processor to:
- responsive to an intelligent screen protector being detached from a paired portable computing device, identify a set of instructions received from the paired portable computing device associated with visually generating an image of a selected smartcard;
- in accordance with the set of instructions, visually generate the image of the selected smartcard in a transparent display area of the intelligent screen protector;
- determine whether a transaction associated with the selected smartcard has been initiated; and
- responsive to the transaction associated with the selected smartcard being initiated, discontinue the visual generation of the image of the selected smartcard in the transparent display area of the intelligent screen protector.

16. The apparatus of claim 15, wherein the instructions further cause the processor to:
- responsive to the set of instruction indicating that authentication of a user of the intelligent screen protector is required, prior to visually generating the image of the selected smartcard in the transparent display area of the intelligent screen protector, prompt the user of the intelligent screen protector for authentication via the intelligent screen protector; and
- responsive to the user of the intelligent screen protector providing authentication via the intelligent screen protector, visually generate the image of the selected smartcard in the transparent display area of the intelligent screen protector.

17. The apparatus of claim 15, wherein the instructions further cause the processor to:
- responsive to the set of instruction indicating a machine readable barcode or Quick Response (QR) code is required for the transaction, generate the machine readable barcode or the QR code associated with the selected smartcard in the transparent display area of the intelligent screen protector.

18. The apparatus of claim 15, wherein the instructions further cause the processor to:

responsive to the set of instruction indicating magnetic field is required for the transaction, generate the magnetic field associated with the selected smartcard via the intelligent screen protector.

19. The apparatus of claim 15, wherein the intelligent screen protector is detached from the paired portable computing device via an electronically controlled magnetic hinge-based lock that couples the intelligent screen protector to the paired portable computing device.

20. The apparatus of claim 15, wherein the instructions further cause the processor to:

responsive to the intelligent screen protector being attached to the paired portable computing device and responsive to the intelligent screen protector not covering the paired portable computing device, display additional content of the portable computing device in a transparent display area of the intelligent screen protector.

21. The apparatus of claim 15, wherein the instructions further cause the processor to:

responsive to the intelligent screen protector being attached to the paired portable computing device and responsive to the intelligent screen protector covering the paired portable computing device, provide one or more of:

a protective surface for the display of the paired portable computing device;

detection and transfer of touches by the user to the intelligent screen protector to the paired portable computing device; or viewing of content of the paired portable computing device through a transparent display area of the intelligent screen protector.

\* \* \* \* \*